US012575495B2

(12) United States Patent
Schroeder

(10) Patent No.: US 12,575,495 B2
(45) Date of Patent: Mar. 17, 2026

(54) SYSTEM AND METHOD FOR AN AGRICULTURAL HARVESTER

(71) Applicant: CNH Industrial America LLC, New Holland, PA (US)

(72) Inventor: Brittany Schroeder, Bunker Hill, IN (US)

(73) Assignee: CNH Industrial America LLC, New Holland, PA (US)

( * ) Notice: Subject to any disclaimer, the term of this patent is extended or adjusted under 35 U.S.C. 154(b) by 136 days.

(21) Appl. No.: 17/960,537

(22) Filed: Oct. 5, 2022

(65) Prior Publication Data

US 2024/0114831 A1    Apr. 11, 2024

(51) Int. Cl.
*A01D 41/127*        (2006.01)
*G05D 1/00*          (2024.01)

(52) U.S. Cl.
CPC ..... *A01D 41/1271* (2013.01); *A01D 41/1277* (2013.01); *A01D 41/1278* (2013.01); *G05D 1/0044* (2013.01)

(58) Field of Classification Search
CPC ............ A01D 41/1271; A01D 41/1278; A01D 41/1277; A01D 41/127; G05D 1/0044
See application file for complete search history.

(56) References Cited

U.S. PATENT DOCUMENTS

| | | | | |
|---|---|---|---|---|
| 6,778,872 | B2 * | 8/2004 | Jorgenson ............ | G06Q 50/188 700/214 |
| 9,152,938 | B2 | 10/2015 | Lang et al. | |
| 9,686,913 | B2 | 6/2017 | Foster et al. | |
| 10,188,037 | B2 | 1/2019 | Bruns | |
| 10,295,703 | B2 | 5/2019 | Dybro et al. | |
| 10,853,894 | B2 | 12/2020 | Rupp et al. | |
| 2018/0122020 | A1 * | 5/2018 | Blank ................. | A01D 41/127 |
| 2020/0090094 | A1 | 3/2020 | Blank | |
| 2020/0128734 | A1 * | 4/2020 | Brammeier ........ | A01D 41/1275 |
| 2020/0337232 | A1 * | 10/2020 | Blank ................. | A01M 7/0089 |

FOREIGN PATENT DOCUMENTS

WO        2014193485 A1    12/2014

OTHER PUBLICATIONS

Extended European Search Report for EP Application No. 23201883.8 dated Mar. 13, 2024 (12 pages).

* cited by examiner

*Primary Examiner* — Stephen Holwerda
(74) *Attorney, Agent, or Firm* — Dority & Manning. P.A.

(57)        ABSTRACT

A harvesting system can include a harvester including a yield monitor system configured to provide information related to a crop-related parameter of a harvested crop material from a harvester sensor and a processing system remote from the harvester and configured to generate processing system-generated data indicative of the crop-related parameter from a processing system sensor. A computing system can be communicatively coupled to the harvester and the processing system. The computing system can be configured to determine a first value for the crop-related parameter at least partially based on harvester-generated data, determine a second value for the crop-related parameter at least partially based on processing system-generated data, determine a difference between the first value and the second value, and generate a correction factor when the difference exceeds a predefined difference range.

19 Claims, 5 Drawing Sheets

SYSTEM AND METHOD FOR AN AGRICULTURAL HARVESTER

FIELD

The present disclosure generally relates to agricultural harvesters and, more particularly, to systems and methods for harvesting operations.

BACKGROUND

Harvesters are used to harvest agricultural crops such as corn, soybeans, wheat, and other grain crops. As the harvester is driven through crop fields, the harvester cuts the crop, separates the desired crop from the undesired waste, stores the crop, and discards the waste. In order to accomplish this, the crop material is collected by a header and deposited into a feeder housing. The crop material is then transported into the harvester by a feed elevator located within the feeder housing. The crop material then passes through a threshing and separating mechanism. As crop material passes through the threshing and separating mechanism, the grain is separated from the stalk material, commonly referred to as material other than grain (MOG).

After passing through the threshing and separating assembly, the grain and MOG are deposited onto a grain cleaning system. The clean grain is directed into a grain elevator and deposited into a storage tank or grain tank. In some instances, a yield monitor system can be used to measure the performance of the cropping system due to multiple items influencing yield. Accordingly, a system and method for operating a yield monitor of an agricultural harvester would be welcomed in the technology.

BRIEF DESCRIPTION

Aspects and advantages of the technology will be set forth in part in the following description, or may be obvious from the description, or may be learned through practice of the technology.

In some aspects, the present subject matter is directed to a harvesting system that can include a harvester including a yield monitor system configured to provide information related to a crop-related parameter of a harvested crop material from a harvester sensor. A processing system can be remote from the harvester and configured to generate processing system-generated data indicative of the crop-related parameter from a processing system sensor. A computing system can be communicatively coupled to the harvester and the processing system. The computing system can be configured to receive, from the harvester sensor, the harvester-generated data associated with the crop-related parameter, determine, with the computing system, a first value for the crop-related parameter at least partially based on harvester-generated data, receive, from the processing system, the processing system-generated data associated with the crop-related parameter, determine, with the computing system, a second value for the crop-related parameter at least partially based on processing system-generated data, determine, with the computing system, a difference between the first value and the second value, and generate, with the computing system, a correction factor when the difference exceeds a predefined difference range.

In some aspects, the present subject matter is directed to a method for an agricultural harvesting operation. The method can include receiving, from a harvester sensor operably coupled with a harvester, harvester-generated data associated with a crop-related parameter and determining, with a computing system, a first value for the crop-related parameter at least partially based on harvester-generated data. The method can also include receiving, from a processing system remote from the harvester, processing system-generated data associated with the crop-related parameter and determining, with the computing system, a second value for the crop-related parameter at least partially based on processing system-generated data. The method can further include determining, with the computing system, a difference between the first value and the second value. Lastly, the method can include generating, with the computing system, a correction factor when the difference exceeds a predefined difference range.

In some aspects, the present subject matter is directed to a method for an agricultural application operation. The method can include receiving, from a harvester sensor operably coupled with a harvester, harvester-generated data associated with a crop-related parameter and determining, with a computing system, a first value for the crop-related parameter at least partially based on harvester-generated data. The method can also include receiving, from an electronic device, processing system-generated data associated with the crop-related parameter and determining, with the computing system, a second value for the crop-related parameter at least partially based on the processing system-generated data. Additionally, the method can include determining, with the computing system, a difference between the first value and the second value. The method can further include generating, with the computing system, a correction factor when the difference exceeds a predefined difference range. Lastly, the method can include applying, with the computing system, the correction factor to the first value upon receipt of an input through a user interface.

These and other features, aspects, and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
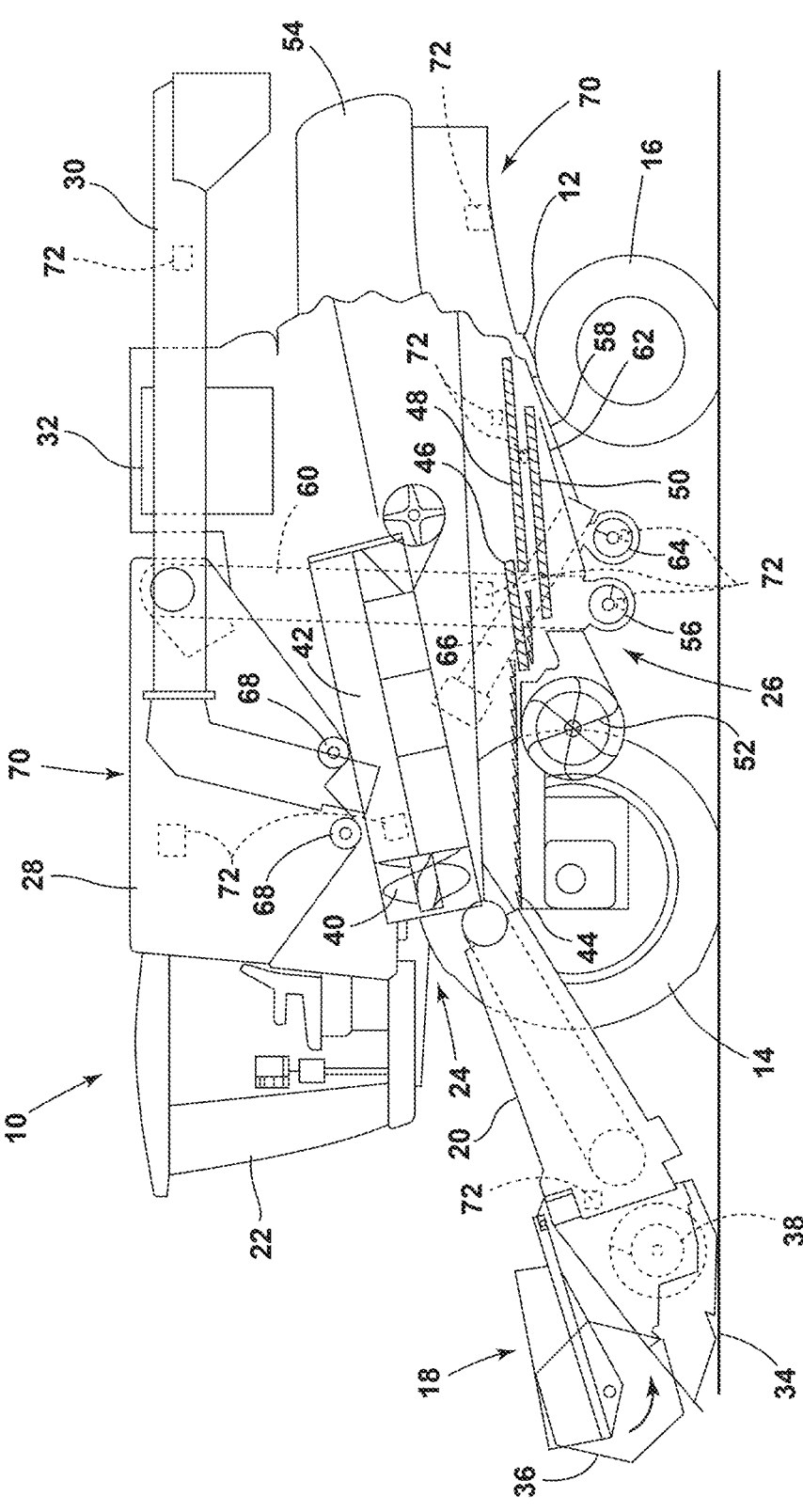
FIG. 1 is a side view of an agricultural harvester in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the disclosure, one or more examples of which are illustrated in the drawings. Each example is provided by way of explanation of the discourse, not limitation of the disclosure. In fact, it will be apparent to those skilled in the art that various modifications and variations can be made in the present disclosure without departing from the scope or spirit of the disclosure. For instance, features illustrated or described as part can be used with another embodiment to yield still a further embodiment. Thus, it is intended that the present disclosure covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to an agricultural product within a fluid circuit. For example, "upstream" refers to the direction from which an agricultural product flows, and "downstream" refers to the direction to which the agricultural product moves. The term "selectively" refers to a component's ability to operate in various states (e.g., an ON state and an OFF state) based on manual and/or automatic control of the component.

Furthermore, any arrangement of components to achieve the same functionality is effectively "associated" such that the functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable, physically interacting components, wirelessly interactable, wirelessly interacting components, logically interacting, and/or logically interactable components.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

In general, the present subject matter is directed to a harvesting system that can include a harvester including a yield monitor system configured to provide information related to a crop-related parameter of a harvested crop material from a harvester sensor. The crop-related parameter can be a quantity of crop material, a moisture content of the crop material, and/or any other information that may be associated with a harvesting operation.

The system may also include one or more transport vehicles suitable for collecting the crop material from the harvester and transporting the crop material to a processing system. The processing system may be remote from the harvester and configured to generate processing system-generated data indicative of the crop-related parameter from a processing system sensor.

A computing system is communicatively coupled to the harvester and the processing system. The computing system may be configured to receive the harvester-generated data associated with the crop-related parameter from the harvester sensor. In turn, the computing system can determine a first value for the crop-related parameter at least partially based on harvester-generated data. Additionally, the computing system may be configured to receive the processing system-generated data associated with the crop-related parameter from the processing system. In turn, the computing system can determine a second value for the crop-related parameter at least partially based on processing system-generated data.

In some cases, the computing system can determine a difference between the first value and the second value and generate a correction factor when the difference exceeds a predefined difference range. The correction factor may be applied to the first value and displayed on a display of the harvesting system to provided crop-related parameter that has been calibrated based on the difference between the first value and the second value. In various instances, the calibrated crop-related parameter may provide more accurate information to a user of the harvesting system.

Referring now to FIG. 1, an agricultural harvester 10 in the form of a combine is shown, which generally includes a chassis 12, ground engaging wheels 14 and 16, a header 18, a feeder housing 20, an operator cab 22, a threshing and separating system 24, a grain cleaning system 26, a grain tank 28, and an unloading auger 30. It should be appreciated that while the agricultural harvester is shown as a combine, the agricultural harvester can be any type of construction that allows for crop material to be harvested such as a conventional combine (which does not have a rotor), rotary combine, hybrid combine, chopper harvester, etc.

In some instances, the front wheels 14 may be larger flotation type wheels, and rear wheels 16 may be smaller steerable wheels. Motive force can be selectively applied to front wheels 14 through a power plant, which may be in the form of a diesel engine 32, and a transmission. Although the harvester 10 is shown as including wheels, it is understood that the harvester 10 may include tracks, such as full tracks or half tracks.

In various examples, the header 18 can be mounted to a front portion of the harvester 10 and can include a cutter bar 34 for severing crops from a field during the forward motion of the harvester 10. A rotatable reel 36 can feed the crop into the header 18, and an auger 38 can feed the severed crop laterally inwardly from each side toward the feeder housing 20. The feeder housing 20 can convey the cut crop to the threshing and separating system 24.

The threshing and separating system 24 may include a rotor 40 and a perforated concave 42. The cut crops are threshed and separated by the rotation of the rotor 40 within the concave 42, and larger elements, such as stalks, leaves, and the like are discharged from the rear of the harvester 10. Smaller elements of crop material including grain and non-grain crop material, including particles lighter than grain, such as chaff, dust, and straw, are discharged through perforations of the concave 42. Grain, which has been separated by the rotor 40 and the perforated concaves 42, falls onto a main grain pan 44 and is conveyed toward the grain cleaning system 26. The grain cleaning system 26 may include an optional pre-cleaning sieve 46, an upper sieve 48 (also known as a chaffer sieve), a lower sieve 50 (also known as a shoe sieve), and a cleaning fan 52. The grain on the sieves 46, 48, and 50 can be subjected to a cleaning action by the fan 52, which provides an airflow through the sieves to remove chaff and other impurities from the grain by making this material airborne for discharge from a straw hood 54 of the harvester 10. The main grain pan 44 and the pre-cleaning sieve 46 can oscillate or reciprocate to transport the grain and finer non-grain crop material to the upper surface of the upper sieve 48. The upper sieve 48 and the lower sieve 50 can be vertically arranged relative to each other, and likewise oscillate in a fore-to-aft manner to spread the grain across the sieves 48, 50, while permitting the passage of cleaned grain by gravity through the openings of the sieves 48, 50.

The clean grain falls to a clean grain auger 56, which can be positioned crosswise below and in front of the lower sieve 50. The clean grain auger 56 receives clean grain from each sieve 48, 50, and from the bottom pan 58 of the grain cleaning system 26. The clean grain auger 56 conveys the clean grain laterally to a grain elevator 60 for transport to a grain tank 28. Tailings from the grain cleaning system 26 fall to a tailings auger on 62. The tailings are transported via the tailings auger 64 and a return auger 66 to the upstream end portion of the grain cleaning system 26 for repeated cleaning action. A pair of grain tank augers 68 at the bottom portion of the grain tank 28 can convey the clean grain within the grain tank 28 to the unloading auger 30 for discharge from the harvester 10. The non-grain crop material proceeds through a residue handling system 70. The residue handling system 70 may include a chopper, counter knives, a windrow door, a residue spreader, and/or any other device.

A yield monitor system 70 can receive data from a number of one or more harvester sensors 72 installed on the agricultural harvester 10. The one or more harvester sensors 72 may generate data indicative of one or more harvesting parameters, including a quantity of crop yield, moisture content of the crop material, rate of flow of the crop into and through the threshing and separating system 24 and the cleaning system 26, the protein content of the crop, and/or any other parameter. The yield monitor system 70 can further receive information from the agricultural harvester 10, such as harvester ground speed, speed of operation of the grain elevator 60, height above the ground of the header 18, and/or any other information.

Figure 2:
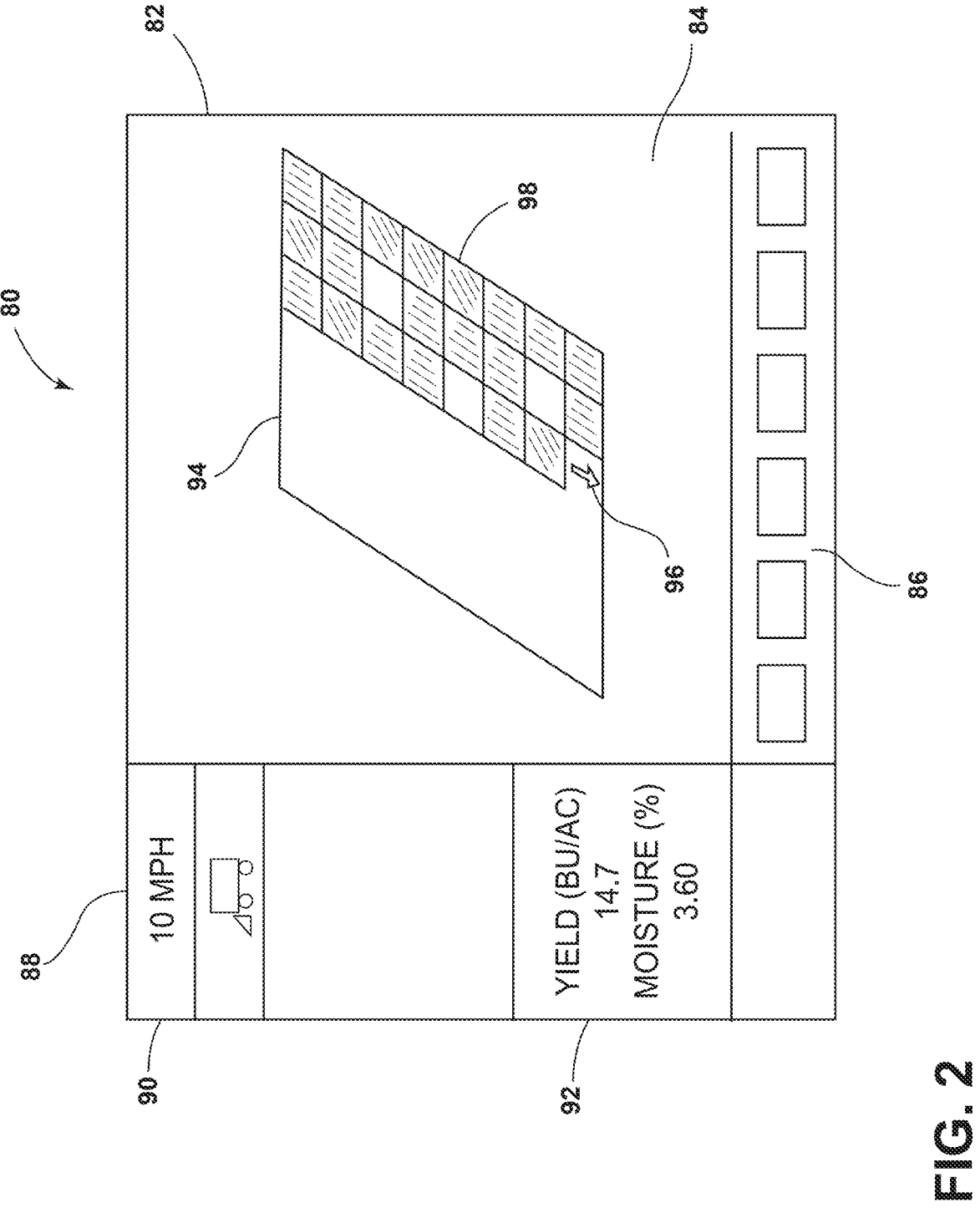
FIG. 2 illustrates a graphical representation of a yield monitor system in accordance with aspects of the present subject matter.

Referring now to FIG. 2, an example user interface 80 that may be within the yield monitor system 70 is illustrated in accordance with various aspects of the present disclosure. In the illustrated example, the yield monitor system 70 can include a display 82 is divided into a map area 84, a graphical operator interface 86, and/or a configurable area 88. The configurable area 88 is shown arranged with a vehicle status area 90 and a yield status area 92. The graphical operator interface 86 can allow the user to configure aspects of the yield monitor system 70. The map area 84 shows a visible map 94 of the field being harvested, with a combined location icon 96 showing the current location of the agricultural harvester 10, and visible indicia 98 of a crop-related parameter currently being measured. The yield status area 92 gives certain data taken from the yield monitor system 70, in this case yield and moisture content, but can provide any other parameter in an offset or overlaid format. In some instances, the configurable area 88 may allow for User Defined Windows (UDW's). The UDW's allow the user to choose which items of the parameters are shown in which portion of the in-cab display 80. Using the UDW's, the user can choose the location of any of the parameters in any portion of the screen.

Figure 3:
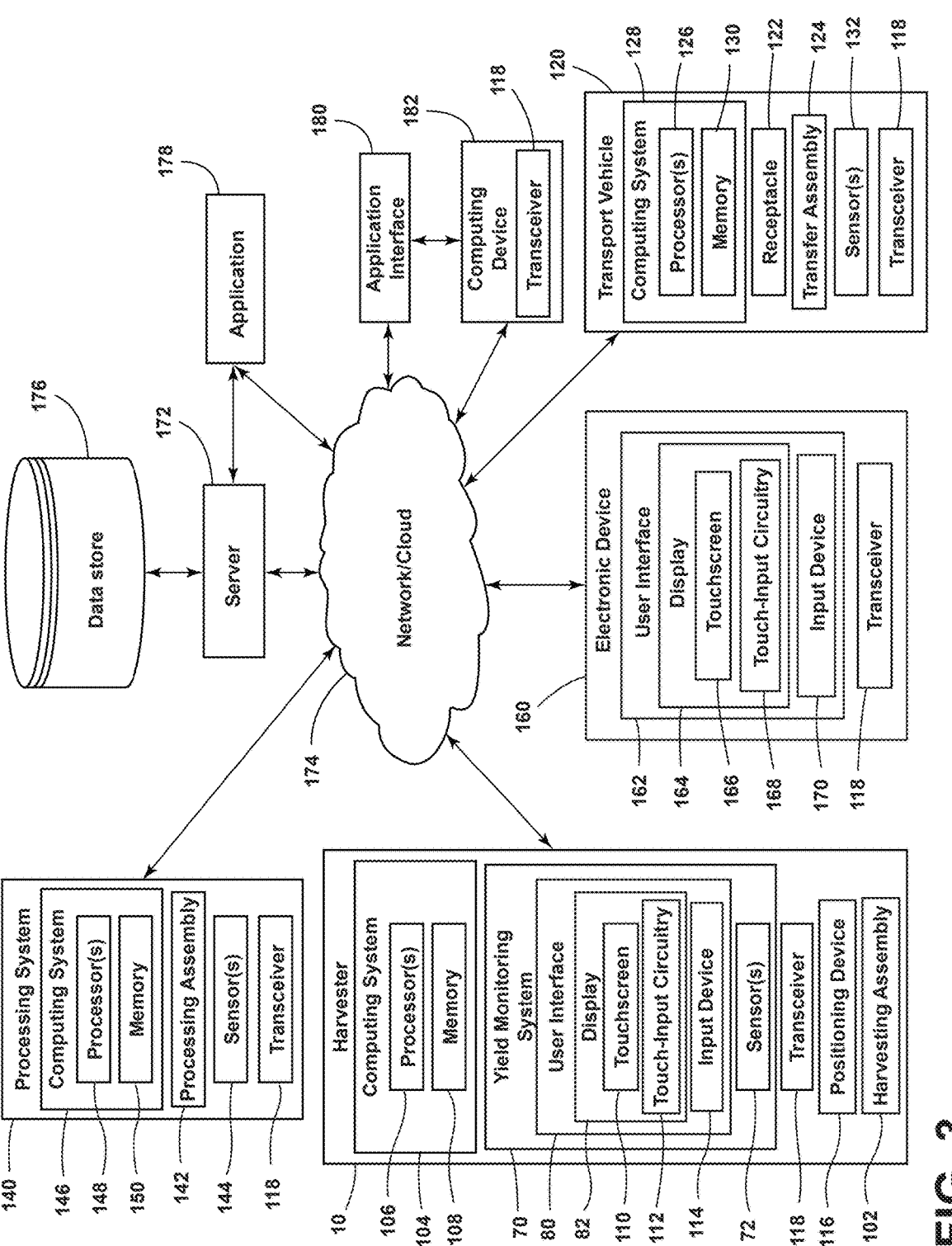
FIG. 3 illustrates a block diagram of components of an agricultural harvesting system in accordance with aspects of the present subject matter.

Referring now to FIG. 3, a schematic view of some embodiments of a harvesting system 100 for a harvesting operation is illustrated in accordance with aspects of the present subject matter. In general, the harvesting system 100 will be described herein with reference to the harvester 10 and yield monitor system 70 described above with reference to FIGS. 1 and 2. However, it will be appreciated that the disclosed harvesting system 100 may generally be utilized with work vehicles having any suitable vehicle configuration. Additionally, the disclosed harvesting system 100 may generally be utilized to perform any suitable baling operation within any suitable field.

In several embodiments, the harvesting system 100 may include a harvester, which may correspond to the harvester 10 described above with reference to FIG. 1. As provided herein, the agricultural harvester 10 can be of any type of construction that allows for crop material to be harvested from a field. To this end, the agricultural harvester 10 can include a harvesting assembly 102, which can include a header 18 (FIG. 1), a feeder housing 20 (FIG. 1), a threshing and separating system 24 (FIG. 1), a grain cleaning system 26 (FIG. 1), a grain tank 28 (FIG. 1), and/or an unloading auger 30 (FIG. 1).

The harvester 10 can further include a yield monitor system 70 that includes one or more one or more harvester sensors 72 installed on the agricultural harvester 10 that can generate data indicative of a quantity of crop or yield, a moisture content of the crop material, a rate of flow of the crop into and through the threshing and separating system 24 and the cleaning system 26, a protein content of the crop, and/or any other parameter. In various examples, the one or more harvester sensors 72 can include a variety of optical, proximity, microwave, and/or load cell sensing technologies. The one or more harvester sensors 72 may additionally or alternatively generate data indicative of an operating condition of the agricultural harvester 10, such as a harvester ground speed, a speed of operation of the grain elevator 60, a height above the ground of the header 18, and/or any other information.

The harvester 10 may also include a computing system 104 that may be operably coupled with the yield monitor system 70. In general, the computing system 104 may correspond to any suitable processor-based device(s), such as a computing device or any combination of computing devices. Thus, as shown in FIG. 3, the computing system 104 may generally include one or more processor(s) 106 and associated memory devices 108 configured to perform a variety of computer-implemented functions (e.g., performing the methods, steps, algorithms, calculations, and the like disclosed herein). As used herein, the term "processor" refers not only to integrated circuits referred to in the art as being included in a computer, but also refers to a controller, a microcontroller, a microcomputer, a programmable logic controller (PLC), an application-specific integrated circuit, and other programmable circuits. Additionally, the memory 108 may generally comprise memory element(s) including, but not limited to, computer-readable medium (e.g., random access memory (RAM)), computer-readable non-volatile medium (e.g., a flash memory), a floppy disk, a compact disc-read only memory (CD-ROM), a magneto-optical disk (MOD), a digital versatile disc (DVD) and/or other suitable memory elements. Such memory 108 may generally be configured to store information accessible to the processor(s) 106, including data that can be retrieved, manipulated, created, and/or stored by the processor(s) 106 and instructions that can be executed by the processor(s) 106.

In some instances, the yield monitor system 70 may include or be operably coupled with a user interface 80 that may be configured to provide feedback (e.g., feedback associated with the harvesting operation) to a user of the harvesting system 100. As such, the user interface 80 may include one or more feedback devices, such as displays, speakers, warning lights, and/or the like, which are configured to provide feedback from the harvesting system 100 to an operator. In addition, some embodiments of the user interface 80 may include one or more input devices 114, such as keypads, touchpads, knobs, buttons, sliders, switches, mice, microphones, and/or the like, which are configured to receive user inputs from the operator. In some examples, the user interface 80 may include a display 80 having a touchscreen 110. In some embodiments, the user interface 80 may include a user input device 114 in the form of circuitry 112 within the touchscreen 110 to receive an input corresponding with a location over the display 80.

In operation, the one or more harvester sensors 72 may capture data indicative of one or more crop-related parameters. The computing system 104 may receive the harvester-generated data associated with the crop-related parameter from the harvester sensor 72. The computing system 104 may also determine a first value for the crop-related parameter at least partially based on harvester-generated data. The first value for the crop-related parameter may be illustrated on the user interface 80 of the harvester 10.

In some embodiments, the harvester 10 may be provided with a positioning device 116 (e.g., a GPS device) that tracks the location of the harvester 10. For example, in some embodiments, the positioning device 116 may be configured to determine the location of the harvester 10 using a satellite navigation position system (e.g. a GPS system, a Galileo positioning system, the Global Navigation satellite system (GLONASS), the BeiDou Satellite Navigation and Positioning system, and/or the like). In such an embodiment, position data may be collected during the harvesting operation (e.g., by being recorded or stored within the memory 108 of an onboard computing system 104 of the harvester 10) that is associated with the location/coordinates of each harvesting path across a field. In addition, the computing system 104 may also include various other suitable components, such as a communications circuit or module, one or more input/output channels, a data/control bus, and/or the like.

In several embodiments, the harvesting system 100 may also include one or more transport vehicles 120 suitable for collecting the crop material from the harvester 10 and transporting the crop material. In various examples, the transport vehicle 34 can include a receptacle 122 that defines a storage area for receiving and holding the crop material and a transfer assembly 124 for loading and unloading the crop material from the harvester 10 (and/or the field), and a processing system 140. In various examples, the one or more transport vehicles 120 may correspond to a fully autonomous vehicle, a semi-autonomy vehicle, or an otherwise manually operated vehicle having one or more autonomous functions (e.g., automated steering or auto-guidance functions).

In some examples, the one or more transport vehicles 120 can further include a computing system 126. The computing system 126 may correspond to any suitable processor-based device(s), such as a computing device or any combination of computing devices. Thus, as shown in FIG. 3, the computing system 126 may generally include one or more processor(s) 128 and associated memory devices 130 configured to perform a variety of computer-implemented functions (e.g., performing the methods, steps, algorithms, calculations, and the like disclosed herein). The memory 130 may generally be configured to store information accessible to the processor(s) 128, including data that can be retrieved, manipulated, created, and/or stored by the processor(s) 128 and instructions that can be executed by the processor(s) 128. In addition, the computing system 126 may also include various other suitable components, such as a communications circuit or module, one or more input/output channels, a data/control bus, and/or the like.

Additionally, the one or more transport vehicles 120 may include one or more vehicle sensors 132 operably coupled with the computing system 126. The one or more vehicle sensors 132 can generate data indicative of a quantity of crop within the receptacle 122, a moisture content of the crop material within the receptacle 122, a rate of flow of the crop into and through the receptacle 122, a protein content of the crop within the receptacle 122, and/or any other parameter regarding the crop within the receptacle 122. In various examples, the one or more vehicle sensors 132 can include a variety of optical, proximity, microwave, and/or load cell sensing technologies. The one or more vehicle sensors 132 may additionally or alternatively generate data indicative of an operating condition of the transport vehicle 120, such as a vehicle ground speed, a speed of operation of the transfer assembly 124, and/or any other information.

The one or more transport vehicles 120 may receive crop material and unload the crop material at another location, such as a storage location or a processing facility. Once unloaded, the crop material may be processed by a processing assembly 142 of a processing system 140. During the processing of the crop material, one or more processing system sensors 144 may be used to generate data indicative of a quantity of crop material (i.e., a weight or mass of crop), a moisture content of the crop material, a protein content of the crop material, and/or any other parameter. In some examples, the harvester sensor 72 is a first sensor type, and the processing system sensor 144 is a second, different sensor type.

In some instances, a portion of the crop material may be sampled for moisture. In addition, the weight of the crop material may be determined by weighing each transport vehicle with the crop material therein and after the crop material has been unloaded from the transport vehicle 120. Based on a difference between the loaded and unloaded weight of the transport vehicle 120, a quantity of crop material may be determined. In some cases, the loaded weight of the transport vehicle 120, the unloaded weight of the transport vehicle 120, the overall weight of the crop material (e.g., the difference between the loaded transport vehicle weight and unloaded transport vehicle weight), and/or the moisture content of the crop material may be provided to the harvesting system 100.

In some examples, the processing system 140 can include a computing system 146. The computing system 146 may correspond to any suitable processor-based device(s), such as a computing device or any combination of computing devices. Thus, as shown in FIG. 3, the computing system 146 may generally include one or more processor(s) 148 and associated memory devices 150 configured to perform a variety of computer-implemented functions (e.g., performing the methods, steps, algorithms, calculations, and the like disclosed herein). The memory 150 may generally be configured to store information accessible to the processor(s) 148, including data that can be retrieved, manipulated, created, and/or stored by the processor(s) 148 and instructions that can be executed by the processor(s) 148. In addition, the computing system 146 may also include various other suitable components, such as a communications circuit or module, one or more input/output channels, a data/control bus, and/or the like.

With further reference to FIG. 3, the harvesting system 100 may further include an electronic device 160, which may be any one of a variety of computing devices that may be separable from one or more of the harvester 10, the one or more transport vehicles 120, and/or the processing system 140 and utilized by a user of the harvesting system 100. For example, the electronic device 160 may be a cell phone, mobile communication device, key fob, wearable device (e.g., fitness band, watch, glasses, jewelry, wallet), apparel (e.g., a tee shirt, gloves, shoes, or other accessories), personal digital assistant, headphones and/or other devices that include capabilities for wireless communications and/or any wired communications protocols. In some instances, the electronic device 160 may include one or more processor-based devices, such as a given controller or computing device or any suitable combination of controllers or computing devices. Thus, in several embodiments, the electronic device 160 may include one or more processor(s) 162, and associated memory device(s) 164 configured to perform a variety of computer-implemented functions. In addition, the electronic device 160 may also include various other suitable components, such as a communications circuit or module, one or more input/output channels, a data/control bus, and/or the like.

In some instances, the electronic device 160 can include a user interface 162 that may be configured to provide feedback (e.g., feedback associated with the baling operation) to a user of the harvesting system 100. The user interface 162 may include one or more feedback devices, such as display screens, speakers, warning lights, and/or the like, which are configured to provide feedback from the harvesting system 100 to the operator. In addition, some embodiments of the user interface 162 may include one or more input devices 170, such as keypads, touchpads, knobs, buttons, sliders, switches, mice, microphones, and/or the like, which are configured to receive user inputs from the operator. In some examples, the user interface 162 may include a display 164 having a touchscreen 166. In some embodiments, the user interface 162 may include a user input device in the form of circuitry 168 within the touchscreen 166 to receive an input corresponding with a location over the display 168.

It should be appreciated that the various functions of the electronic device 160 may be performed by a single processor-based device or may be distributed across any number of processor-based devices, in which instance, such devices may be considered to form part of the electronic device 160. For instance, the functions of the electronic device 160 may be distributed across multiple application-specific controllers, such as a sensor controller, and/or the like.

In some examples, the harvester 10, the one or more transport vehicles 120, the processing system 140, and/or the electronic device 160 may be communicatively coupled with one or more remote sites, such as a remote server 172 via a network/cloud 174 to provide data and/or other information therebetween through respective transceivers 118. The network/cloud 174 represents one or more systems by which the harvester 10, the one or more transport vehicles 120, the processing system 140, and/or the electronic device 160 may communicate with the remote server 172. The network/cloud 174 may be one or more of various wired or wireless communication mechanisms, including any desired combination of wired and/or wireless communication mechanisms and any desired network topology (or topologies when multiple communication mechanisms are utilized). Exemplary communication networks 62 include wireless communication networks (e.g., using Bluetooth, IEEE 802.11, etc.), local area networks (LAN), and/or wide area networks (WAN), including the Internet and the Web, which may provide data communication services and/or cloud computing services. The Internet is generally a global data communications system. It is a hardware and software infrastructure that provides connectivity between computers. In contrast, the Web is generally one of the services communicated via the Internet. The Web is generally a collection of interconnected documents and other resources, linked by hyperlinks and URLs. In many technical illustrations when the precise location or interrelation of Internet resources are generally illustrated, extended networks such as the Internet are often depicted as a cloud (e.g. 174 in FIG. 3). The verbal illustration has been formalized in the newer concept of cloud computing. The National Institute of Standards and Technology (NIST) provides a definition of cloud computing as "a model for enabling convenient, on-demand network access to a shared pool of configurable computing resources (e.g., networks, servers, storage, applications, and services) that can be rapidly provisioned and released with minimal management effort or service provider interaction." Although the Internet, the Web, and cloud computing are not the same, these terms are generally used interchangeably herein, and they may be referred to collectively as the network/cloud 174.

The server 172 may be one or more computer servers, each of which may include at least one processor and at least one memory, the memory storing instructions executable by the processor, including instructions for carrying out various steps and processes. The server 172 may include or be communicatively coupled to a data store 176 for storing collected data as well as instructions for the computing system 104 of the harvester 10, the computing system 126 of the one or more transport vehicles 120, the computing system 146 of the processing system 140, and/or the electronic device 160 with or without intervention from a user, the harvester 10, the one or more transport vehicles 120, the processing system 140, and/or the electronic device 160. Moreover, the server 172 may be capable of analyzing initial or raw sensor data received from the harvester 10, the one or more transport vehicles 120, the processing system 140, and/or the electronic device 160 and final or post-processing data (as well as any intermediate data created during data processing). Accordingly, the instructions provided to any one or more of the harvester 10, the one or more transport vehicles 120, the processing system 140, and/or the electronic device 160 may be determined and generated by the server 172 and/or one or more cloud-based applications 178.

With further reference to FIG. 3, the server 172 can also generally implement features that may enable the computing system 104 of the harvester 10, the computing system 126 of the one or more transport vehicles 120, the computing system 146 of the processing system 140, and/or the electronic device 160 to communicate with cloud-based applications 178. Communications from the electronic device 160 can be directed through the network/cloud 174 to the server 172 and/or cloud-based applications 178 with or without a networking device, such as a router and/or modem. Additionally, communications from the cloud-based applications 178, even though these communications may indicate one of the harvester 10, the one or more transport vehicles 120, the processing system 140, and/or the electronic device 160 as an intended recipient, can also be directed to the server 172. The cloud-based applications 178 are generally any appropriate services or applications 178 that are accessible through any part of the network/cloud 174 and may be capable of interacting with the harvester 10, the one or more transport vehicles 120, the processing system 140, and/or the electronic device 160.

In various examples, the computing system 104 of the harvester 10, the computing system 126 of the one or more transport vehicles 120, the computing system 146 of the processing system 140, and/or the electronic device 160 can be feature-rich with respect to communication capabilities, i.e. have built-in capabilities to access the network/cloud 174 and any of the cloud-based applications 178 or can be loaded with, or programmed to have, such capabilities. The computing system 104 of the harvester 10, the computing system 126 of the one or more transport vehicles 120, the computing system 146 of the processing system 140, and/or the electronic device 160 can also access any part of the network/cloud 174 through industry-standard wired or wireless access points, cell phone cells, or network nodes. In some examples, users can register to use the remote server 172 through the harvester 10, the one or more transport vehicles 120, the processing system 140, and/or the electronic device 160, which may provide access to the harvester 10, the one or more transport vehicles 120, the processing system 140, and/or the electronic device 160 and/or thereby allow the server 172 to communicate directly or indirectly with the computing system 104 of the harvester 10, the computing system 126 of the one or more transport vehicles

120, the computing system 146 of the processing system 140, and/or the electronic device 160. In various instances, the computing system 104 of the harvester 10, the computing system 126 of the one or more transport vehicles 120, the computing system 146 of the processing system 140, and/or the electronic device 160 may also communicate directly, or indirectly, with the computing system 104 of the harvester 10, the computing system 126 of the one or more transport vehicles 120, the computing system 146 of the processing system 140, and/or the electronic device 160 or one of the cloud-based applications 178 in addition to communicating with or through the server 172. According to some examples, the computing system 104 of the harvester 10, the computing system 126 of the one or more transport vehicles 120, the computing system 146 of the processing system 140, and/or the electronic device 160 can be preconfigured at the time of manufacture with a communication address (e.g. a URL, an IP address, etc.) for communicating with the server 172 and may or may not have the ability to upgrade or change or add to the preconfigured communication address.

Referring still to FIG. 3, when a new cloud-based application 178 is developed and introduced, the server 172 can be upgraded to be able to receive communications for the new cloud-based application 178 and to translate communications between the new protocol and the protocol used by the computing system 104 of the harvester 10, the computing system 126 of the one or more transport vehicles 120, the computing system 146 of the processing system 140, and/or the electronic device 160. The flexibility, scalability, and upgradeability of current server technology render the task of adding new cloud-based application protocols to the server 172 relatively quick and easy.

In several embodiments, an application interface 180 may be operably coupled with the network/cloud 174 and/or the application 178. The application interface 180 may be configured to receive data from the one or more harvester sensors 72, the one or more vehicle sensors 132 of the one or more transport vehicles 120, the one or more processing system sensors 144, and/or the electronic device 160. In various embodiments, data may also be provided from other sources, such as an operator of the harvester 10, the one or more transport vehicles 120, the processing system 140, a company, and/or other persons that may access the application interface 180 to enter the data. Additionally or alternatively, the data may be received from a remote server 172. For example, the data may be received in the form of software that can include one or more objects, agents, lines of code, threads, subroutines, databases, application programming interfaces (APIs), or other suitable data structures, source code (human-readable), object code (machine-readable). The application interface 180 can be implemented in hardware, software, or a suitable combination of hardware and software, and which can be one or more software systems operating on a general-purpose processor platform, a digital signal processor platform, or other suitable processors.

In some examples, at various predefined periods and/or times, the computing system 104 of the harvester 10, the computing system 126 of the one or more transport vehicles 120, the computing system 146 of the processing system 140, and/or the electronic device 160 may communicate with the server 172 through the network/cloud 174 to obtain the stored instructions, if any exist. Upon receiving the stored instructions, the computing system 104 of the harvester 10, the computing system 126 of the one or more transport vehicles 120, the computing system 146 of the processing system 140, and/or the electronic device 160 may implement the instructions. The server 172 may additionally store data, parameters, or information related to harvesting operations that are performed on a common field, proximate fields, and/or any other location and operate and/or provide instructions to the computing system 104 of the harvester 10, the computing system 126 of the one or more transport vehicles 120, the computing system 146 of the processing system 140, and/or the electronic device 160 in conjunction with the stored data, parameters, or information with or without intervention from a user, the computing system 104 of the harvester 10, the computing system 126 of the one or more transport vehicles 120, the computing system 146 of the processing system 140, and/or the electronic device 160. In some instances, multiple electronic devices 160 on multiple vehicles 202 can send event-related data to the server 172 for storage in the data store 176. This collection of event-related data can be accessed by any number of users, the computing system 104 of the harvester 10, the computing system 126 of the one or more transport vehicles 120, the computing system 146 of the processing system 140, and/or the electronic device 160 to assist with the generation of harvesting parameters and/or information.

In some instances, a computing device 182 may also access the server 172 to obtain data, parameters, and/or information related to stored events. The computing device 182 may be a mobile device, tablet computer, laptop computer, desktop computer, watch, virtual reality device, television, monitor, or any other computing device 182 or another visual device.

In various embodiments, the data used by the harvesting system 100 and/or any other component described herein for any purpose may be based on data provided by the one or more harvester sensors 72, the one or more vehicle sensors 132 of the one or more transport vehicles 120, the one or more processing system sensors 144, the electronic device 160 and/or third-party data that may be converted into comparable data that may be used independently or in conjunction with data collected from the one or more harvest sensors of the harvester 10, the one or more vehicle sensors 132 of the one or more transport vehicles 120, the one or more processing system sensors 144, and/or the electronic device 160.

In operation, the harvester 10 can receive data from a number of one or more harvester sensors 72 installed on the agricultural harvester 10 during a harvesting operation (and/or at any other time). The data may be associated with one or more harvesting parameters, including a quantity of crop yield, moisture content of the crop material, rate of flow of the crop into and through the threshing and separating system 24 and the cleaning system 26, the protein content of the crop, and/or any other information. The yield monitor system 70 can further receive information from the agricultural harvester 10, such as harvester ground speed, speed of operation of the grain elevator 60, height above the ground of the header 18, and/or any other information. The computing system 104 of the harvester 10, the computing system 126 of the one or more transport vehicles 120, the computing system 146 of the processing system 140, and/or the electronic device 160 may receive the harvester-generated data associated with the crop-related parameter from the harvester sensor 72. The computing system 104 of the harvester 10, the computing system 126 of the one or more transport vehicles 120, the computing system 146 of the processing system 140, and/or the electronic device 160 may also determine a first value for the crop-related parameter at least partially based on harvester-generated data. The first value for the crop-related parameter may be illustrated on the user interface 80 of the harvester 10. The data generated by the one or more harvester sensors 72 may additionally or alternatively be stored on the harvester computing system 104 and/or transmitted to the network/cloud 174 for usage within other components of the harvesting system 100.

At various times, the one or more transport vehicles 120 may receive the crop material from the harvester 10. In some cases, one or more transport vehicles 120 can include one or more vehicle sensors 132. The data generated by the vehicle sensors 132 of the one or more transport vehicles 120 may be stored on the transport vehicle computing system 126 and/or transmitted to the network/cloud 174 for usage within other components of the harvesting system 100.

Once at a defined location, the one or more transport vehicles 120 can unload the crop material at a processing system 140. During the processing of the crop material by a processing assembly 142, the one or more processing system sensors 144 may be used to generate data indicative of a quantity of crop material, a moisture content of the crop material, a protein content of the crop material, and/or any other information. For example, a portion of the crop material may be sampled for moisture. In addition, the weight of the crop material may be determined by weighing each transport vehicle with the crop material therein and after the crop material has been unloaded from the transport vehicle 120. Based on a difference between the loaded and unloaded weight of the transport vehicle 120, a quantity of crop material may be determined. In some cases, the loaded weight of the transport vehicle 120, the unloaded weight of the transport vehicle 120, the overall weight of the crop material (e.g., the difference between the loaded transport vehicle weight and unloaded transport vehicle weight), and/or the moisture content of the crop material may be provided to a user of the harvesting system 100 through a ticket. The processing system data indicative of one or more crop material parameters can be provided on the ticket may be entered by a user of the electronic device 160 and/or automatically generated by the processing system 140.

Once the processing system-generated data is transmitted to the harvesting system 100, the harvesting system 100 can determine a second value for the crop-related parameter at least partially based on the processing system-generated data. In various examples, the harvesting system 100 can be configured to receive the processing system-generated data from an electronic device 160 that is remote from the processing system 140. In such instances, the processing system data may be inputted in a defined manner and/or through any other form (e.g., a text message) that is analyzed by the harvesting system 100 to determine the processing system data. For example, the harvesting system 100 may utilize any character recognition algorithm to determine the inputted data and correlate the data to a defined structure for further processing.

Additionally, the harvesting system 100 can determine a difference between the first value and the second value and generate a correction factor when the difference exceeds a predefined difference range (e.g., 10 percent). If a difference exceeds the defined threshold, the harvesting system 100 may generate a correction factor to account for the difference. For instance, if a difference between the harvester-generated quantity of crop material and the processing system-generated quantity is within the defined difference range, a correction factor may not be generated. Conversely, if a difference between the first value and the second value is equal to or outside of the defined difference range, a correction factor is generated and applied to the first value of the crop-related parameter. In various examples, the server 172, the computing system 104 of the harvester 10, the computing system 126 of the one or more transport vehicles 120, the computing system 146 of the processing system 140, and/or the electronic device 160 and/or any other harvesting system 100 may implement machine learning engine methods and algorithms that utilize one or several machine learning techniques including, for example, decision tree learning, including, for example, random forest or conditional inference trees methods, neural networks, support vector machines, clustering, and Bayesian networks. These algorithms can include computer-executable code that can be retrieved by the server 172 through the network/cloud 174 and may be used to generate a predictive evaluation of the calibration data. In some instances, the machine learning engine may allow for changes to the sensor calibrations to be performed without human intervention.

Figure 4:
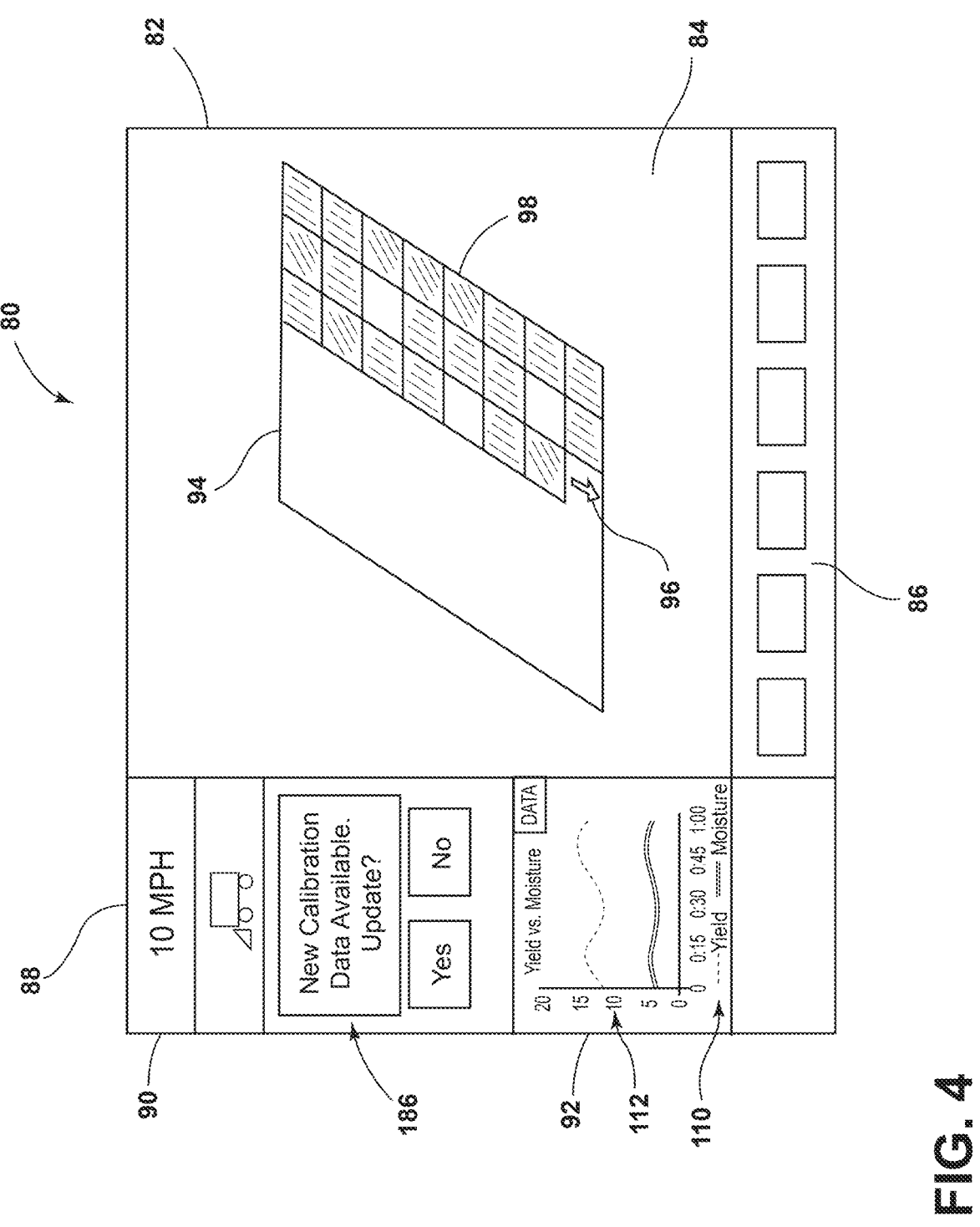
FIG. 4 illustrates a graphical representation of a yield monitor system in accordance with aspects of the present subject matter.

In some cases, as shown in FIG. 4, when a correction factor is generated, a notification 186 of the generated correction factor may be provided to the display 82 of the harvester 10. Once the notification 186 is provided, the harvesting system 100 may wait for confirmation of calibration prior to updating the harvested-generated parameters with the correction factors. Additionally or alternatively, the harvesting system 100 apply the correction factor to the first value of the crop-related parameters once a correction factor is generated.

The correction factor can be applied to the first value of a determined crop-related parameter such that crop material harvested after the application of the correction factor is monitored based on the first value of the crop-related parameters with the correction factor and/or the correction factor may be applied to the previously harvested crop material. The first value of the crop-related parameters may be adjusted based on the correction factor until a subsequent correction factor is generated for that respective parameter. As such, the managements system may form a closed-loop system for updating the first value of the crop-related parameters.

In some examples, the harvesting system 100 may further include data related to any changes in data over time. For example, a moisture content of the crop material may be altered over time due to the harvesting process and/or other conditions, such as environmental conditions. As such, the harvesting system 100 may also consider these conditions and/or the amount of time between harvesting and processing to determine an appropriate correction factor. In such instances, as the time between harvesting and processing increases, the change in moisture content may also increase. Additionally or alternatively, as the environmental humidity and/or an environmental temperature (or other environmental condition) is increased, the change in moisture content may also increase (with the moisture content being less at the processing system 140 than the harvester 10). It will be appreciated that any other conditions may considered when determining a correction factor.

Figure 5:
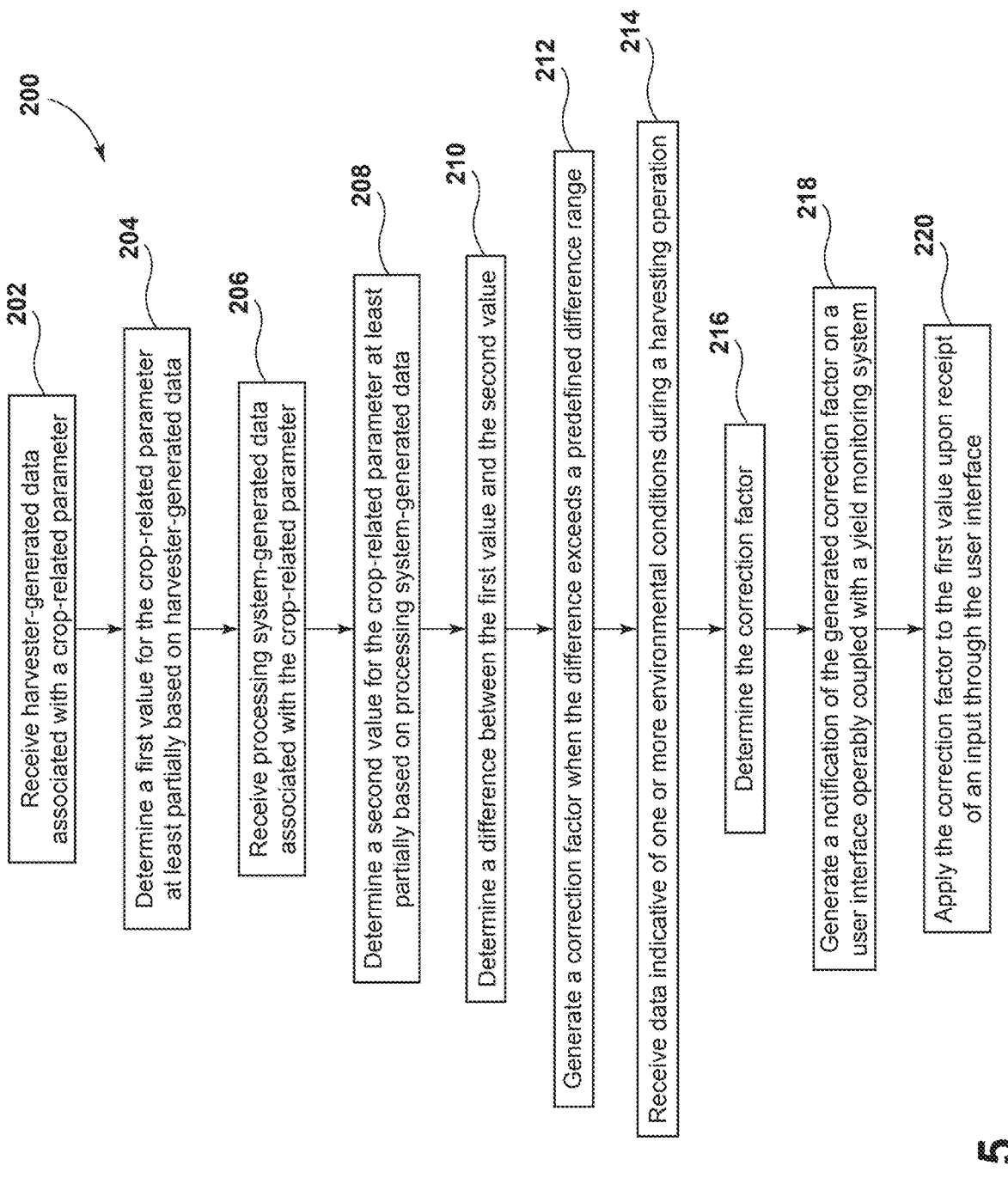
FIG. 5 illustrates a flow diagram of a method for an agricultural application operation in accordance with aspects of the present subject matter.

Referring now to FIG. 5, a flow diagram of some embodiments of a method 200 for an agricultural harvesting operation is illustrated in accordance with aspects of the present subject matter. In general, the method 200 will be described herein with reference to the harvester, the one or more transport vehicles, the processing system, and the system 100 described above with reference to FIGS. 1-4. However, the disclosed method 200 may generally be utilized with any suitable agricultural system having any other suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (202), the method 200 can include receiving harvester-generated data associated with a crop-related parameter from a harvester sensor operably coupled with a harvester. At (204), the method 200 can include determining a first value for the crop-related parameter at least partially based on harvester-generated data with a computing system. As provided herein, the harvester may be operably coupled with various components through the network/cloud. In such examples, the computing system may be located within the harvester and/or remotely from the harvester. Moreover, the computing system may be one or more computing devices that may be located in various locations without departing from the scope of the present disclosure. In some cases, determining the second value for the crop-related parameter can further include calculating input data inputted through an electronic device into the processing system-generated data. In such instances, the processing system data may be inputted in a defined manner and/or through any other form (e.g., a text message) that is analyzed by the harvesting system to determine the processing system data.

At (206), the method 200 can include receiving processing system-generated data associated with the crop-related parameter from a processing system remote from the harvester. At (208), the method 200 can include determining a second value for the crop-related parameter at least partially based on processing system-generated data with the computing system.

At (210), the method 200 can include determining a difference between the first value and the second value with the computing system. At (212), the method 200 can include generating a correction factor when the difference exceeds a predefined difference range with the computing system. As provided herein, the difference range may be defined by the harvesting system and/or user defined.

At (214), the method 200 can include receiving data indicative of one or more environmental conditions during a harvesting operation. In some cases, the correction factor is at least partially based on the environmental conditions.

At (216), the method 200 can include determining the correction factor. The correction factor may be used to better align the first value for the crop-related parameter to the second value for the crop-related parameter. In various instances, the correction factor may be determined with the utilization of one or more machine-learned models.

At (218), the method 200 can include generating a notification of the generated correction factor, on a user interface operably coupled with a yield monitor system. At (220), the method 200 can include applying the correction factor to the first value upon receipt of an input through the user interface with the computing system.

In various examples, the method 200 may implement machine learning methods and algorithms that utilize one or several vehicle learning techniques including, for example, decision tree learning, including, for example, random forest or conditional inference trees methods, neural networks, support vector vehicles, clustering, and Bayesian networks. These algorithms can include computer-executable code that can be retrieved by the computing system and/or through a network/cloud and may be used to evaluate and update the correction factor. In some instances, the vehicle learning engine may allow for changes to the correction factor to be performed without human intervention.

It is to be understood that the steps of any method disclosed herein may be performed by a computing system upon loading and executing software code or instructions which are tangibly stored on a tangible computer-readable medium, such as on a magnetic medium, e.g., a computer hard drive, an optical medium, e.g., an optical disc, solid-state memory, e.g., flash memory, or other storage media known in the art. Thus, any of the functionality performed by the computing system described herein, such as any of the disclosed methods, may be implemented in software code or instructions which are tangibly stored on a tangible computer-readable medium. The computing system loads the software code or instructions via a direct interface with the computer-readable medium or via a wired and/or wireless network. Upon loading and executing such software code or instructions by the controller, the computing system may perform any of the functionality of the computing system described herein, including any steps of the disclosed methods.

The term "software code" or "code" used herein refers to any instructions or set of instructions that influence the operation of a computer or controller. They may exist in a computer-executable form, such as vehicle code, which is the set of instructions and data directly executed by a computer's central processing unit or by a controller, or a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A harvesting system comprising:
a harvester including an unloading auger and a yield monitor system configured to provide information related to a crop-related parameter of a harvested crop material;
a harvester sensor operably coupled with the harvester and configured to generate harvester-generated data associated with the crop-related parameter during a harvesting operation of a crop material, the harvester-generated data associated with the crop-related parameter prior to the crop material being exhausted from the unloading auger;
a transport vehicle remote from the harvester, the transport vehicle configured to receive the crop material after the crop material is exhausted from the unloading auger;
a processing system configured to generate processing system-generated data indicative of the crop-related parameter from a processing system sensor during the processing of the crop material by a processing assembly with the crop material located within the transport vehicle; and
a computing system communicatively coupled to the harvester and the processing system, the computing system being configured to:
receive, from the harvester sensor, the harvester-generated data associated with the crop-related parameter;
determine, with the computing system, a first value for the crop-related parameter at least partially based on harvester-generated data;
receive, from the processing system, the processing system-generated data associated with the crop-related parameter;
determine, with the computing system, a second value for the crop-related parameter at least partially based on processing system-generated data;
determine, with the computing system, a difference between the first value and the second value; and
generate, with the computing system, a correction factor when the difference exceeds a predefined difference range.

2. The system of claim 1, wherein the crop-related parameter is a quantity of crop material.

3. The system of claim 1, wherein the crop-related parameter is a moisture content of the crop material.

4. The system of claim 1, wherein the computing system is configured to receive the processing system-generated data from an electronic device that is remote from the processing system.

5. The system of claim 1, wherein the computing system is further configured to:
generate, on a user interface operably coupled with the yield monitor system, a notification of the generated correction factor.

6. The system of claim 5, wherein the computing system is further configured to:
apply, with the computing system, the correction factor to the first value upon receipt of an input through the user interface.

7. The system of claim 1, wherein the computing system is further configured to:
receive data indicative of one or more environmental conditions during a harvesting operation, wherein the correction factor is at least partially based on the environmental conditions.

8. The system of claim 1, wherein the computing system is remote from the harvester and the processing system.

9. The system of claim 1, wherein the harvester sensor is a first sensor type and the processing system sensor is a second, different sensor type.

10. A method for an agricultural harvesting operation, the method comprising:
receiving, from a harvester sensor operably coupled with a harvester, harvester-generated data associated with a crop-related parameter associated with a crop material during a first harvesting operation;
determining, with a computing system, a first value for the crop-related parameter at least partially based on the harvester-generated data;
exhausting the crop material from the first harvesting operation from the harvester;
receiving the crop material from the first harvesting operation at a processing system remote from the harvester;

determining processing system-generated data associated with the crop-related parameter during the processing of the crop material from the first harvesting operation by a processing assembly of the processing system after the crop material from the first harvesting operation is transferred from the harvester to the processing system;

determining, with the computing system, a second value for the crop-related parameter at least partially based on processing system-generated data;

determining, with the computing system, a difference between the first value and the second value;

generating, with the computing system, a correction factor when the difference exceeds a predefined difference range; and receiving, from the harvester sensor operably coupled with the harvester, harvester-generated data associated with a crop-related parameter during a second harvesting operation; and determining, with a computing system, a third value for the crop-related parameter by applying the correction factor to the harvester-generated data generated during the second harvesting operation.

11. The method of claim 10, further comprising:

generating, on a user interface operably coupled with a yield monitor system, a notification of the generated correction factor.

12. The method of claim 10, further comprising:

receiving data indicative of one or more environmental conditions during a harvesting operation, wherein the correction factor is at least partially based on the environmental conditions.

13. The method of claim 10, further comprising:

determining the correction factor based on one or more machine-learned models.

14. The method of claim 10, wherein determining, with the computing system, the second value for the crop-related parameter further comprises calculating input data inputted through an electronic device into the processing system-generated data.

15. A method for an agricultural application operation, the method comprising:

receiving, from a harvester sensor operably coupled with a harvester, harvester-generated data associated with a crop-related parameter, wherein the harvester-generated data is based on a crop material within the harvester;

determining, with a computing system, a first value for the crop-related parameter at least partially based on harvester-generated data;

receiving, from an electronic device, processing system-generated data associated with the crop-related parameter, wherein the processing system-generated data is generated during the processing of the crop material by a processing assembly after the crop material is transferred from the harvester to the processing assembly, the processing assembly remote from the harvester, wherein the harvester-generated data and the processing system-generated data are both generated based on measurements of a common crop material;

determining, with the computing system, a second value for the crop-related parameter at least partially based on the processing system-generated data, wherein the first value and the second value are determined based on physical processing of the common crop material, the first value determined based on physical processing of the common crop material at a first time and the second value determined based on physical processing of the common crop material at a second time, the second time being after the first time;

determining, with the computing system, a difference between the first value and the second value;

generating, with the computing system, a correction factor when the difference exceeds a predefined difference range; and applying, with the computing system, the correction factor to the first value upon receipt of an input through a user interface.

16. The method of claim 15, further comprising:

displaying a notification that the correction factor has been generated on a user interface within the harvester.

17. The method of claim 16, wherein the correction factor is applied to the first value upon receipt of the input through the user interface.

18. The method of claim 15, further comprising:

receiving data indicative of one or more environmental conditions during a harvesting operation, wherein the correction factor is at least partially based on the one or more environmental conditions.

19. The method of claim 15, further comprising:

determining the correction factor based on one or more machine-learned models.

* * * * *